United States Patent [19]

Kuchuk-Yatsenko et al.

[11] 4,319,117

[45] Mar. 9, 1982

[54] METHOD OF FLASH BUTT WELDING

[76] Inventors: Sergei I. Kuchuk-Yatsenko, ulitsa Filatova, 1/22, kv. 47; Boris I. Kazymov, ulitsa Kotovskogo, 11, kv. 20; Vasily F. Zagadarchuk, Kharkovskoe shosse, 2, kv. 232; Sergei A. Solodovnikov, ulitsa Solomenskaya, 41, kv. 50; Vasily A. Sakharnov, ulitsa Solomenskaya, 41, kv. 93, all of Kiev, U.S.S.R.

[21] Appl. No.: 102,443

[22] Filed: Dec. 11, 1979

[51] Int. Cl.³ ............................................. B23K 11/04
[52] U.S. Cl. ....................................... 219/100; 219/97
[58] Field of Search .................................. 219/97, 100

[56] References Cited

U.S. PATENT DOCUMENTS 3,341,685  9/1967  Paton .............................. 219/100 X

OTHER PUBLICATIONS

Russian-language publication having translated title of "Pressure Welding: Fundamentals" by A. S. Helmann, Mashinostroyeniye Publishers, Moscow, 1970, p. 159, Fig. 107, w/trans.
Russian-language publication having translated title "Selection of the Optimum Upsetting in Flash Butt Welding of Steel Pipes" by V. S. Lifshits, from Pipeline Construction, published by U.S.S.R. Ministry for Gas Industry, Moscow, NEDRA Publishers, 1966, No. 9, pp. 18-20, three figures, and English-language translation.

*Primary Examiner*—Elliot A. Goldberg
*Attorney, Agent, or Firm*—Fleit & Jacobson

[57] ABSTRACT

Work pieces to be joined together by the flash butt welding method are brought together at a preset no-load voltage, the end faces of the work pieces are fused, and an upsetting is accomplished. The amount of the upsetting is determined within from 1.2 to 3.0 of the amount of the maximum gap between the end faces of the work pieces being welded together, which gap forms in the course of fusing the end faces of the work pieces. The maximum gap is determined from the following relation:

$$\Delta_{max} = f(U_o, \delta),$$

where:
- $\Delta_{max}$ = maximum gap;
- $U_o$ = no-load voltage;
- $\delta$ = thickness of the work pieces being welded together.

Empirical formulas to determine the maximum gap for work pieces of various thicknesses are presented.

2 Claims, 6 Drawing Figures

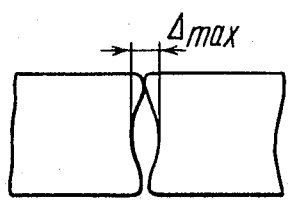
FIG. 1
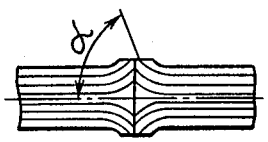
FIG. 2
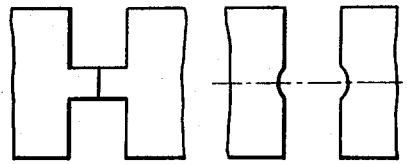
FIG. 3a  FIG. 3b
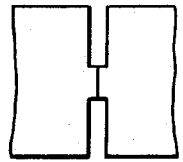 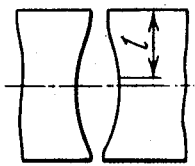
FIG. 3c  FIG. 3d

METHOD OF FLASH BUTT WELDING

BACKGROUND OF THE INVENTION

1. Field of the Invention

The present invention relates to the art of flash butt welding, and is specifically concerned with a method of flash butt welding in fabricating structures from ferrous-metal rolled products, such as pipes, sheets, plates, T-sections, etc.

2. Description of the Prior Art

It is well known that the flash butt welding process is accompanied by a highly concentrated local heating of the metal through fusing a surface layer thereof by an electric current flowing via the work pieces being welded together. This is followed by the upsetting which levels off the surfaces or faces being joined, forces the molten metal and oxides (if occur) out of the gap between the faces, and thus forms a welded joint.

The formation in the flash butt welding of sound, defect-free joints offering high strength and ductility is ensured by preventing the metal from oxidation or, if this fails to be attained, by removing the oxides jointly with the molten metal from the butt joint through upsetting.

In the course of the fusion, the work pieces being joined are caused to approach each other with the welding current switched on. At the moment when the faces of the work pieces touch each other, electrical contacts form therebetween. At the initial stage of the fusion, the contacts develop between the faces of a solid metal, and later there may appear contacts between the films of a liquid metal or of an oxide thereof.

During the fusion, the work pieces being joined are pressed against each other with a relatively low axial force; consequently, the electrical resistance of the contacts formed in the course of the fusion is high, and as a result a large amount of heat is generated therein. The metal at the contact point and in the region adjacent thereto melts down very rapidly with the formation of liquid metal bridges between the faces of the work pieces being joined, which bridges serve as short-time current conductors.

Moving the faces of the work pieces being joined towards each other brings about an increase in the bridge diameter. At the next moment, however, the current through the bridge increases rapidly, and the effect of the electromagnetic forces causes the bridge diameter to decrease, in which the current density increases, which results in a vigorous heating of the bridge. When the current density reaches a certain magnitude, the metal at the centre of the bridge evaporates. An impetuous rise of the pressure of the metal vapour and gases inside the bridge results in its explosion-like rupture.

The explosion of the molten metal bridge leaves craters on the faces of the elements being joined. The next bridge contact develops, as a rule, at some other place, where the distance between the faces of the elements being joined is minimum. At the point where a molten metal bridge exists at a given moment, the metal is molten, while the metal at the bottom of an adjacent crater may, due to the heat transfer, cool down below the solidus temperature with the formation of oxides.

The fusion of the end faces of the elements being joined prepares them for the formation of the joint, the formation being accomplished by the upsetting. If a layer of a molten metal completely covers the end faces at the moment when these come into contact, a joined interlayer of the metal melt forms therebetween, and the subsequent upsetting progressively closes the gap over the entire area of the joint. At the points of deep craters, where opposite deepest craters coincide with each other, the gap formed therebetween is the largest one. If at the beginning of the upsetting or at the moment when the end faces come into contact there is no liquid metal at such points on the end faces, the joint is formed in a solid phase. Closing all the gaps between the end faces of the elements being joined calls for increasing the amount of upsetting. Both an insufficient and an excessive upsetting are believed to impair the quality of the joint. A small upsetting fails to completely remove the possible oxides from the butt joint and may leave the craters unclosed, whereas the excessive upsetting leads to a sharp distortion of the rolling streaks on the rolled metal.

The practice has shown that the weldments produced by the prior art methods of flash butt welding (Gel'man A. S. Osnovy svarki davleniem (Fundamentals of pressure welding). "Mashinostroenie," Moskow, 1970, p. 159), when subjected to the bending test, feature the formation of first cracks already at small angles of bending of a specimen from its initial position. The first cracks develop at the points where the distorted rolling streaks emerge to the surface of the joint. The practice has also shown that the welded joints of rolled products display a higher ductility if the angle of distortion of the rolling streaks with respect to the longitudinal axis of the elements being welded together does not exceed a critical angle whose value is within 25°–30°. Such a distortion of the rolling streaks in welded joints can be attained at an exactly defined amount of upsetting. This means that the amount of upsetting must be, on the one hand, sufficient enough to close all the gaps in the butt joint and, on the other hand, such as to result in the least distortion of the rolling streaks.

For such an exact determination of the amount of upsetting however, the amount of the maximum gap, $\Delta_{g.max}$, must be found beforehand.

There is also known a method of flash butt welding, disclosed in the article "Selecting the optimum upsetting in flash butt welding of steel pipes" by Livshic V. S. et al. ("Stroitel' stvo truboprovodov" ("Pipeline construction"), 1966, No. 9, p. 18). The method consists in fusing the end faces of rolled work pieces in particular pipes, at a preset no-load voltage and upsetting them. The amount of upsetting is determined with regard to the "temperature at the butt joint boundary," which term denotes the temperature at the pipe cross-section, spaced from the end faces being fused before the upsetting at a distance equal to half the amount of upsetting. Assumed as the temperature of the butt joint boundary in the prior art method is preferably that within from 1,100° to 1,150° C. Determining the amount of upsetting from the temperature of the butt joint boundary shows that to produce a good quality joint of 20-mm thick work pieces being welded together, the amount of upsetting is to be of 14 mm. With such upsetting, as is claimed in the article, the average bending angle is to 100°. The average bending angle is determined by conducting the bending test of 12 specimens cut out at different places of the weld joint. A joint where the average bending angle is not less than 100° is generally assumed as a good-quality joint.

It has been ascertained by experiments that a good quality welded joint, in terms of an average bending angle, is attained with a temperature at the butt joint boundary, ranging from 1,100° to 1,150° C. If the temperature of the butt joint boundary is assumed to be less than 1,100° C., in which case the determined amount of upsetting exceeds the optimum one, or to be greater than 1,150° C., which yields the amount of upsetting below the optimum value, the quality of welded joints is impaired. The first condition (t°<1,100° C.) is essentially correct, whereas the second one (t°>1,150° C.) is wrong inasmuch as a welded joint or a metallic bond during the upsetting arises already at the moment when the elements being welded together come in contact with each other. The metallic bonds in the butt joint may loosen in essentially two events: when the end faces of the elements being joined are before the upsetting covered by a large amount of thick oxide film due to violation of the proper welding conditions and also when the end faces being joined have been excessively heated, which results in a burning of the metal on the faces. The welding conditions being correctly selected, the metallic bond between the elements arises at the moment when these come in contact with each other only in the course of the upsetting.

According to another available data, the upset allowance for work pieces of the same thickness is selected to be of 13 mm, which is close to the amount of upsetting, determined by the above-described method.

With such amounts of upsetting, however, the rolling streaks get considerably distorted in the welding zone. The bending angle of most of specimens of such steel grades as CT. 3, steel 20, 17Г1C, 18Г2AΨ, 09Г2 and X60 subjected to the bending test, is much less than 100°, and of some specimens even less than 40°.

The welded joints of rolled products are known to display a better ductility if the angle of distortion of the rolling streaks with respect to the longitudinal axis of the elements being welded together does not exceed a critical angle whose value is within 25°-30°. Such a distortion of the rolling streaks in welded joints is obtainable with the minimum possible amounts of upsetting.

SUMMARY OF THE INVENTION

The object of the present invention is to provide a method of flash butt welding, which ensures the formation of welded joints with a higher quality of the weld and improved mechanical properties of the metal in the weld zone.

The aim set forth is attained by the provision of a method of flash butt welding of ferrous-metal rolled products, consisting in fusing the end faces of the work pieces being welded together with a preset no-load voltage and upsetting the work pieces by an amount sufficient to close the maximum gap between the end faces of the elements, wherein, according to the invention, the amount of upsetting of rolled work pieces ranges within 1.2-3.0 of the amount of the maximum gap, the maximum gap being determined from the following relation:

$$\Delta_{max} = f(U_o, \delta), \quad (1)$$

where:
$\Delta_{max}$ = maximum gap;
$U_o$ = no-load voltage;
$\delta$ = thickness of the rolled work pieces being welded together.

According to one aspect of the invention, welding together rolled work pieces of from 5 to 20 mm in thickness is accomplished with the upsetting ranging within from 1.2 to 1.8 of the maximum gap which is determined from the formula:

$$\Delta_{max} = U_o(0.022 \cdot \delta + 0.200) \quad (2)$$

According to another aspect of the invention, welding together rolled work pieces of more than 20 mm in thickness is accomplished with the upsetting ranging within from 1.5 to 3.0 of the maximum gap which is determined from the formula:

$$\Delta_{max} = U_o(0.001 \cdot \delta + 0.620) \quad (3)$$

The method of the present invention, owing to a more accurate determination of the maximum gap, makes it also possible to more accurately determine the amount of upsetting, which provides for producing high-quality welded joints featuring stable mechanical properties, which has been proved by tests of various joints made by the method of the invention.

BRIEF DESCRIPTION OF THE DRAWINGS

The exact nature of the invention will be more clear from the following detailed description thereof with reference to the accompanying drawings, wherein:

FIG. 1 diagrammatically illustrates the welding zone at the moment of fusion of the end faces of the rolled work pieces being welded together;

FIG. 2 diagrammatically illustrates a welded joint produced by the flash butt welding method, and distinctly shows the rolling streaks;

FIG. 3 diagrammatically illustrates the welding zone and shows in a simplified manner the process of development of craters; FIGS. 3a and 3b illustrate the rupture of a contact with a "large" height of asperities on the faces being fused, and FIGS. 3c and 3d illustrate the specific features of the development of craters on the faces being fused with a "small" gap therebetween.

DETAILED DESCRIPTION OF THE PREFERRED EMBODIMENT OF THE INVENTION

The $\Delta_{max}$ (FIG. 1) is known to depend upon the specific features of the development and rupture of contacts in the course of fusing the faces being welded together of rolled work pieces 1 and 2. If the gap in the vicinity of the contact is large enough, which is possible with a "large" height of asperities on the faces being fused, then no appreciable recesses are left on the fusion faces in the rupture of the contacts (FIGS. 3a, 3b). When the gap between the faces is "small" (FIG. 3c), the electrodynamic forces force the metal of the contacts, as it melts down, into the gap, where the metal forms a welding region characterized by a metallic bond between the work pieces being welded together; accordingly, the region is heated over its entire surface simultaneously. The depth of a crater which develops in fusing down the welding region will be the deeper, the larger is the area of this region, which area is in its turn conditioned by the gradient of the temperature field ahead of the fusion front. The magnitude of a temperature gradient depends on the conditions of heat transfer in the corresponding region. The heat transfer rate at the edge of the work piece being welded is lower than that at the centre of the fusion surface, and hence the depth of the crater at the edge of the work piece is smaller. Therefore, the depth of the crater diminishes as the fusion front travels from the centre of the fusion surfaces to the edges thereof.

With a large enough thickness of the specimens, the heat transfer in the course of travel of the fusion front remains unchanged at a definite distance from the edge of the fusion surface (FIG. 3d). In this case, regardless of the location of the contact, its heating corresponds to the pattern of heating of a semi-infinite body by a point source. Therefore, when the thickness of a segment of the cross-section being welded exceeds 2.1, the maximum depth of the craters, and hence also the maximum amount of gap between the work pieces being welded together, little depends on the thickness of these work pieces, 1 being the extent of the portions of the end faces being fused, which portions are disposed on the surface of the work pieces being welded together and across which portions the gap between the end faces of the work pieces increases from the minimum to the maximum, as shown in FIG. 3d. Experiments have shown this extent to be of from 9 to 10 mm. Consequently, a variation of the thickness of a work piece being welded above 18-20 mm exerts substantially no effect on the amount of $\Delta_{max}$, in contrast to that observed at thicknesses less than 18 mm. It has been ascertained by experiments that the maximum gap between the work pieces varies in direct proportion to their thickness, but the rate of variation of the amount of $\Delta_{max}$ in welding together products of less than 18 mm in thickness greatly exceeds that in welding the products whose thickness is more than 20 mm.

The heating of the metal of the welding regions is governed, not only by the heat removal conditions, but also by the electrical conductivity of these regions. The conductivity increases with the no-load voltage $U_o$, and therefore high values of the $U_o$ create more favourable conditions for extending the area of the welding region. Besides, a high voltage causes a larger amount of metal to be fused down per unit time, with the result that a large amount of molten metal which forms the welding region accumulates ahead of the fusion front in the gap between the work pieces being welded together; this increases the depth of the craters and hence also the maximum gap between the work pieces. Studies have shown the maximum gap between the work pieces to vary in direct proportion to the no-load voltage, such a relationship holding true in welding together products of any thickness.

The amount of the maximum gap is essentially independent of other welding variables. Thus, varying the approach speed of the work pieces in their welding together results only in changing the configuration of craters on the faces being fused. As the approach speed is increased, the slope of the edges of the craters decreases, while the depth of the craters remains unchanged.

On the basis of the data thus obtained, empirical formulas to determine the amount of the maximum gap between the work pieces being welded together in the course of fusing were derived. For a thickness from 5 to 20 mm:

$$\Delta_{max} = U_o(0.022 \cdot \delta + 0.200),$$

and for a thickness above 20 mm:

$$\delta_{max} = U_o(0.001 \cdot \delta + 0.620)$$

where $\Delta_{max}$ and $\Delta$ are respectively the maximum gap and the thickness of the work pieces being welded together, in mm, and $U_o$ is the no-load voltage, in volts.

With the minimum possible amount of upsetting, which is of $\Delta_1 = 1.1 \cdot \Delta_{max}$, high-quality joints can be obtained only with a definite width of the heating zone, i.e. of a portion of the work piece being welded, extending inwardly from the end face thereof, across which portion the temperature varies from the melting point down to the ambient temperature. The width of the heating zone, however, is governed by a number of factors and varies over a wide range. Thus, the width of the heating zone generally increases with the thickness of the work pieces being welded together. The width depends upon the welding conditions: it is smaller under load conditions and larger under "soft" ones. The width of the heating zone is particularly dependent upon the technique of the flash welding: it is smaller in a cold flash welding than in a hot flash welding.

In view of the above considerations, the amount of upsetting is selected within the range of $(1.2-3.0) \cdot \Delta_{max}$, the exact amount being set with account for the width of the heating zone.

In welding work pieces of 5-20 mm in thickness under hard conditions, characterized by a short thermal cycle, i.e. by a relatively small heating zone, the amount of upsetting is set within the range of $(1.2-1.5) \cdot \Delta_{max}$.

For example, during a cold flash but welding of pipes made from steel 20 with a 219-mm diameter and 12-mm wall thickness with the aid of a butt-welding machine having a thermal cycle duration of 60 s at a voltage of $U_o = 6.5$ V, the amount of upsetting was set at $\Delta_1 = 4$ mm:

$\Delta_1 = 1.3 \cdot \Delta_{max}$, where $\Delta_{max} = 6.5(0.0 - 22 \cdot 12 + 0.200) = 3.01$ mm;

$\Delta_1 = 1.3 \cdot 3.01 = 3.913$ mm; we take $\Delta_1 = 4$ mm.

In welding together work pieces of the same thickness (from 5 to 20 mm) under "soft" conditions, featuring a long thermal cycle, the amount of upsetting is set within the range of $(1.5-1.8) \cdot \Delta_{max}$.

For example, in a cold flash butt welding of pipes of steel X60 with a 1,420-mm diameter and 18-mm wall thickness in a butt-welding machine with a thermal cycle duration of 150 s at a voltage of $U_o = 7.0$ V, the amount of upsetting was set at $\Delta_1 = 7$ mm:

$\Delta_1 = 1.7 \cdot \Delta_{max}$, where $\Delta_{max} = 7(0.0 - 22 \cdot 18 + 0.200) = 4.172$ mm;

$\Delta_1 = 1.7 \cdot 4.172 = 7.092$ mm; we take $\Delta_1 = 7$ mm.

In joining together 20 mm thick, 200 mm wide plates of steels CT. 3 17Г1С, 09Г2 with the aid of a welding machine using the cold flash welding technique with a thermal cycle duration of 100 s at a voltage of $U_o = 6.8$ V, the amount of upsetting was set at $\Delta_1 = 6.5$ mm:

$\Delta_1 = 1.5 \cdot \Delta_{max}$, where $\Delta_{max} = 6.8(0.0 - 22 \cdot 20 + 0.200) = 4.35$ mm;

$\Delta_1 = 1.5 \cdot 4.35 = 6.525$ mm; we take $\Delta_1 = 6.5$ mm.

In welding together work pieces of over 20 mm in thickness, such as in joining large-section rolled products under "soft" conditions, using the cold flash welding technique, the amount of upsetting is set within the range of $(1.5-1.8) \cdot \Delta_{max}$.

For example, in welding together 30 mm thick, 200 mm wide plates of steel 18Г2АФ with the aid of a machine having a thermal cycle duration of 180 s at a voltage of $U_o = 7.2$ V, the amount of upsetting was set at $\Delta_1 = 8.5$ mm:
$\Delta_1 = 1.8 \cdot \Delta_{max}$, where $\Delta_{max} = 7.2(0.001 \cdot 30 + 0.620) = 4.68$ mm;
$\Delta_1 = 1.8 \cdot 4.68 = 8.424$ mm; we take $\Delta_1 = 8.5$ mm.

In welding together work pieces of over 20 mm in thickness, such as in joining large-section rolled products, using the hot flash welding technique, the amount of upsetting is set within the range of $(1.8-3.0) \cdot \Delta_{max}$.

For example, in welding together 50 mm thick, 180 mm wide plates of steel CT. 3 with the aid of a machine with an overall thermal cycle duration of 200 s at a voltage of $U_o = 7.5$ V, the amount of upsetting was set at $\Delta_1 = 13$ mm:
$\Delta_1 = 2.5 \cdot \Delta_{max}$, where $\Delta_{max} = 7.5(0.001 \cdot 50 + 0.620) = 5.1$ mm;
$\Delta_1 = 2.5 \cdot 5.1 = 12.75$ mm; we take $\Delta_1 = 14$ mm.

In welding together pipes of steel 20 with a 159-mm diameter and 10-mm thickness with a thermal cycle duration of 60 s at a voltage of $U_o = 6.2$ V, the amount of upsetting, $\Delta_1$, was set at $1.2 \cdot \Delta_{max}$, where:
$\Delta_{max} = 6.2(0.022 \cdot 10 + 0.200) = 2.6$ mm;
$\Delta_1 = 1.2 \cdot 2.6 = 3.10$ mm; rounding off to the nearest multiple of 0.5, we take $\Delta_1 = 3$ mm.

In addition, when welding together 50 mm thick plates of steel CT. 3 with an overall thermal cycle duration of 260 s at a voltage of $U_o = 7.1$ V, the upsetting was accomplished by an amount determined as follows:

$$\Delta_1 = 3.0 \cdot \Delta_{max},$$

where
$\Delta_{max} = 7.1(0.001 \cdot 50 + 0.620) = 4.76$ mm;
$\Delta_1 = 3.0 \cdot 4.76 = 14.35$ mm;
the amount of upsetting was taken as 14.5 mm.

The following negative examples illustrate the employment of the method of the invention with an infringement of the specified range which defines the amount of upsetting necessary for closing the maximum gap.

If the amount of upsetting is set as $1.1 \cdot \Delta_{max}$, then, under otherwise equal conditions, points of poor fusion, which are unclosed craters, may develop in the butt joint. Such phenomenon is observed more frequent in the cases when the heating of the work pieces being welded together is higher. For example, in welding together carbon-steel pipes of 219 mm in diameter and with a 12-mm thick wall in a butt-welding machine having a low resistance of the secondary circuit, at a thermal cycle duration on the order of 80 s, $U_o = 6.5$ V, and $\Delta_1 = 1.1 \cdot \Delta_{max}$, the maximum gap was determined:
$\Delta_{max} = 6.5(0.022 \cdot 12 + 0.200) = 3.01$ mm;
$\Delta_1 = 1.1 \cdot 3.01 = 3.311$ mm.
Rounding off this value to the nearest greater multiple of $\Delta 0.5$, we take $\Delta_1 = 3.5$ mm. Tensile tests of such joints show their strength properties to be essentially at the level of those of the base metal; however, unclosed crates were detected in three of the seven joints.

If the amount of upsetting is set over $3.0 \cdot \Delta_{max}$, this in practically all events will result in the increase of the distortion of the rolling streaks, because the maximum amount of upsetting, which is equal to $3.0 \cdot \Delta_{max}$, corresponds to the heating zone whose extension is not only inexpedient from the standpoint of the quality of the joint, but is also difficult to attain in practice.

Thus, in welding together 50 mm thick, 180 mm wide plates of steel CT. 3 with an overall thermal cycle duration of 220 s at a voltage of $U_o = 7.5$ V and the amount of upsetting of $3.2 \cdot \Delta_{max}$, the maximum gap was determined: $\Delta_{max} = 7.5 \ (0.001 \cdot 50 + 0.620) = 5.1$ mm; $\Delta_1 = 3.2 \cdot 5.1 = 16.32$. We take $\Delta_1 = 16.5$ mm.

In the welded joint produced with such upsetting, the angle of distortion of the rolling streaks exceeds 30°, and the average bending angle decreases.

The proposed welding method makes it possible to produce high-quality joints featuring stable mechanical properties. This has been proved by comprehensive tests of various joints produced by the proposed welding method.

All the welded joints produced by the method of the invention (the principal welding variables have been specified hereinabove) featured high and stable mechanical properties, and the angle of distortion of the rolling streaks was within 30° (FIG. 2).

Of the overall amount of the specimens subjected to the bending test (524 specimens in all), only 0.9% (2 specimens from a 30 mm thick joint and 3 specimens from 50 mm thick joints) had a bending angle in the range of 100° to 180°, while the rest of the specimens (99.1%) featured a bending angle of 180° (FIG. 1, (b); the average bending angle for 30 mm thick joints amounted to 174°, and for 50 mm thick ones, to 163°. The prior art welding methods allow to produce joints whose average bending angle is as small as 100°, with a possible decrease of the bending angles of some specimens down to 40°.

All the specimens subjected to the tensile test (262 specimens in all) displayed the strength equal to that of the base metal.

The employment of the method of the invention for welding rolled products enables the mechanical properties of joints produced by a flash welding to be raised to the level of the demands placed upon critical weldments, such as upon large-diameter gas and petroleum pipelines constructed in northern regions as well as upon high-pressure stream pipelines at thermal power stations. This makes it possible to use such a highly productive and automated welding technique as the flash butt welding with a high economic efficiency.

The practical application of the method of the invention allows also to reduce the amount of flash which should be removed from the welded joints after the welding. This considerably reduces the labour required for its removal and raises the efficiency of the welding as a whole, which in its turn cuts down the cost of trimming welded joints. Reducing the upsetting allowance cuts down the loss of the metal being welded. Thus, the employment of the innovative technique in welding together 1,420-mm diameter pipes with a 18-mm thick wall saves about 4 kg of metal per one welded joint.

What is claimed is:

1. A method of flash butt welding of ferrous-metal rolled products of from 5 to 20 mm in thickness, which method comprises fusing the end faces of the work pieces being welded together with a preset no-load voltage and upsetting the work pieces by an amount ranging within from 1.2 to 1.8 of the amount of the maximum gap between the end faces of the work pieces being welded together, the maximum gap being determined from the following relation:

$$\Delta_{max} = U_o(0.022 \cdot \delta + 0.200),$$

where:
$\Delta_{max}$ = maximum gap;

$U_o$ = no-load voltage;
$\delta$ = thickness of the work pieces being welded together.

2. A method of flash butt welding of ferrous-metal rolled products of more than 20 mm in thickness, which method comrises fusing the end faces of the work pieces being welded together with a preset no-load voltage and upsetting the work pieces by an amount ranging within from 1.5 to 3.0 of the amount of the maximum gap between the end faces of the work pieces being welded together, the maximum gap being determined from the following relation:

$$\Delta_{max} = U_o(0.021\delta + 0.620),$$

where:
$\Delta_{max}$ = maximum gap;
$U_o$ = no-load voltage;
$\delta$ = thickness of the work pieces being welded together.

* * * * *

UNITED STATES PATENT AND TRADEMARK OFFICE
CERTIFICATE OF CORRECTION

PATENT NO. : 4,319,117
DATED : March 9, 1982
INVENTOR(S) : KUCHUK-YATSENKO, et al It is certified that error appears in the above—identified patent and that said Letters Patent is hereby corrected as shown below:

On the title page, insert

-- (30)   Foreign Application Priority Data

December 19, 1978   USSR..............2693503 --

Signed and Sealed this

Twenty-first Day of September 1982

[SEAL]

Attest:

Attesting Officer

GERALD J. MOSSINGHOFF

Commissioner of Patents and Trademarks